No. 878,939.
PATENTED FEB. 11, 1908.
D. P. COOPER.
REINFORCED BAR FOR VEHICLE RUNNING GEARS.
APPLICATION FILED APR. 8, 1907.
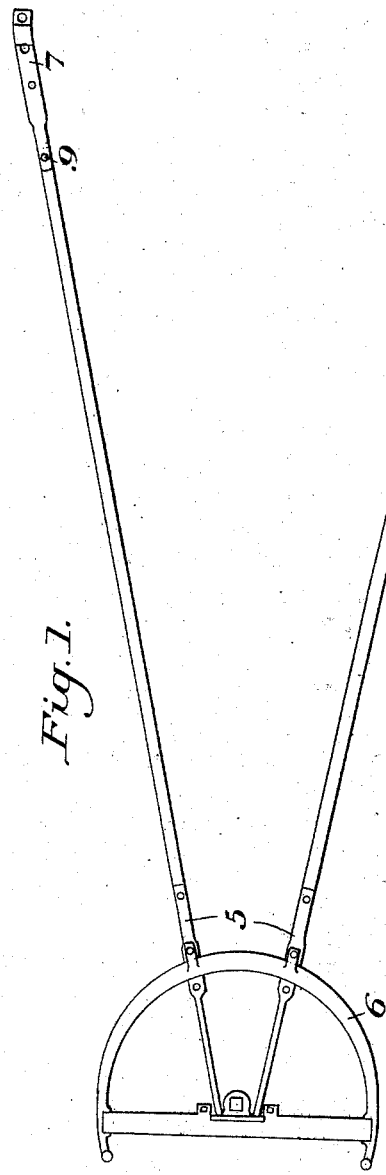
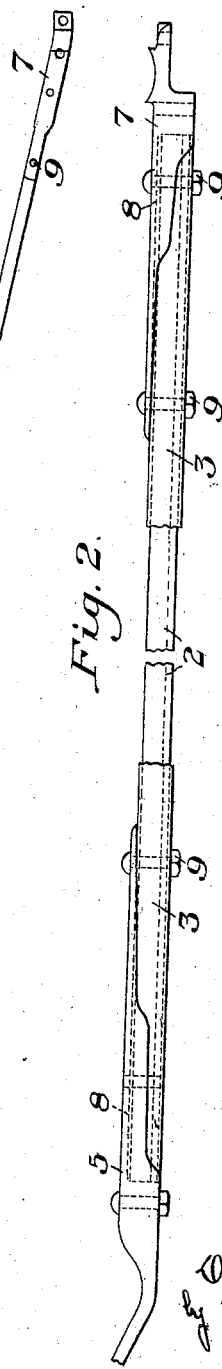
WITNESSES
INVENTOR

UNITED STATES PATENT OFFICE.

DAVID P. COOPER, OF STRUTHERS, OHIO.

REINFORCED BAR FOR VEHICLE RUNNING-GEARS.

No. 878,939.　　　　　Specification of Letters Patent.　　　　Patented Feb. 11, 1908.

Application filed April 8, 1907. Serial No. 366,893.

*To all whom it may concern:*

Be it known that I, DAVID P. COOPER, of Struthers, Mahoning county, Ohio, have invented a new and useful Improvement in Reinforced Bars for Vehicle Running-Gears, of which the following is a full, clear, and exact description, reference being had to the accompanying drawings, forming part of this specification, in which—

Figure 1 is a plan view of a vehicle running gear embodying my invention; Fig. 2 is a side view partly broken away of one of the reinforced reach bars, and Fig. 3 is an enlarged cross-section of the same.

My invention has relation to reinforced wooden bars for various purposes, but particularly designed for use in vehicle running gears. The scarcity and high price of timber suitable for the construction of light running gears has made it extremely desirable to provide means which will enable the use of cheaper material in such construction; and the object of my invention is to provide a metal reinforcement for wooden bars by means of which wood of inferior quality may be employed and a bar be provided which shall be light and at the same time have sufficient strength for the purpose.

With this object in view, my invention consists in a wooden bar having a novel form of metallic reinforcement surrounding and inclosing the same, and more particularly in the means employed by which the reinforcing metal covering is secured to the bar.

My invention also consists in the novel construction, arrangement and combination of parts all substantially as hereinafter described and pointed out in the appended claims.

Referring to the drawings, the numeral 2 designates a wooden bar of any desired cross-section, and 3 a metallic reinforcing covering therefor. This reinforcing covering is preferably formed of sheet steel of comparatively thin guage, which is fitted closely around the exterior of the wooden bar with its free edges brought together and extended inwardly in parallel relation to each other, as shown at 4, into a longitudinal groove or recess in one side of the bar. If desired, the joint between the inwardly turned portions or lips 4 may be further secured by means of solder.

In the drawings, I have shown my invention as applied to the reach bars of a vehicle running gear, said bars having at their forward ends the gear irons 5, by which they are attached to the fifth wheel 6, and at their rear ends perch irons 7 for their attachment to the axle. These irons are provided with the flanged socket portions 8, which receive the end portions of the reinforced reach bars, and are secured thereto by means of the bolts 9. These bolts pass entirely through the bars, and also through the reinforcing covering 3, and form a further means for securing said covering. To accommodate these bolts, I have shown the inturned lips 4 of the metal covering 3 as being to one side of the center of the cross-section of the bar 2, so that the bolts may pass centrally through said bar.

My invention provides a reinforcement, which permits the use of woods of inferior quality, since it is arranged to very greatly increase the resistance of the bar. In fact, the bar with the reinforcement can be made of such small section that it is practically no heavier than the wooden bar alone, while of so much greater strength as to obviate the necessity of the usual bottom plates. The manner in which the reinforcement is secured not only holds it firmly in place, but materially increases the resistance to vertical strain and also provides a smooth exterior surface free from any projections so that when the bars are painted they present a smooth and finished appearance.

While, as above stated, the invention is particularly applicable to vehicle running gear construction, it is useful for a variety of other purposes.

Various changes may be made in the details of construction and arrangement by those skilled in the art, without departing from my invention. Thus, the securing lips 4, instead of being arranged to one side of the center, may be at the center; and instead of being at the bottom of the bar, they may be at the top or at either side, as may be desired.

What I claim is:—

1. As a new article of manufacture, a wooden bar of uniform cross section having a longitudinal groove in one face at one side of the longitudinal center thereof, a metal sheath bent around the bar with its opposite edges bent into the groove, and a fastening piercing the bar and the sheath at one side of the groove, substantially as described.

2. As a new article of manufacture, a wooden bar of uniform cross section having a longitudinal groove in one face at one side of the longitudinal center thereof, a metal sheath bent around the bar with its opposite edges bent into the groove, cap pieces embracing the ends of the bar and sheath, and fastenings piercing the cap pieces, the sheath and the bar at one side of the groove, substantially as described.

3. A reach bar comprising a wooden bar of uniform cross section having a longitudinal groove in one face at one side of the longitudinal center thereof, a metallic sheath bent around the bar with its opposite edges bent into the groove, a gear iron fitted to one end of the bar, a perch iron fitted to the opposite end of the bar, and fastenings centrally piercing the respective irons, sheath and the bar at one side of the groove, substantially as described.

In testimony whereof, I have hereunto set my hand.

DAVID P. COOPER.

Witnesses:
J. M. GLENN,
N. N. WILSON.